(12) United States Patent　(10) Patent No.:　US 6,961,344 B1
Gaspar et al.　(45) Date of Patent:　Nov. 1, 2005

(54) VERIFICATION OF COLLISION DETECTION AND RESOLUTION IN A HOME NETWORK

(75) Inventors: Harand Gaspar, Cupertino, CA (US);
Peter K. Chow, San Jose, CA (US);
Jenny L. Fischer, Mt. View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 877 days.

(21) Appl. No.: 09/884,789

(22) Filed: Jun. 19, 2001

(51) Int. Cl.[7] .......................................... H04L 12/413
(52) U.S. Cl. ...................................... 370/447
(58) Field of Search ............................... 370/445, 447, 370/448

(56) References Cited

U.S. PATENT DOCUMENTS 6,130,894 A * 10/2000 Ojard et al. ................. 370/421
6,256,317 B1 * 7/2001 Holloway et al. ........... 370/447
2001/0055311 A1 * 12/2001 Trachewsky et al. ....... 370/445

* cited by examiner

*Primary Examiner*—Chi Pham
*Assistant Examiner*—Viet Le
(74) *Attorney, Agent, or Firm*—Winstead Sechrest & Minick P.C.

(57) ABSTRACT

A method and system for verifying collision detection and resolution in a home network that comprises a plurality of stations is disclosed. Each station in the network includes a host media access controller program and a media access controller, where each station may transmit a frame when a transmission channel is inactive. When a collision is detected, the station ceases transmission of the frame, and chooses a backoff level to resolve the conflict. The station increments a backoff level counter in response to receiving backoff signal from another station on the network, and decrements the backoff counter in response to successfully transmitting the frame. The backoff level counter is maintained such that it may be accessed through the host media access controller for monitoring collision resolution, thereby eliminating the need to monitor signals over the network.

22 Claims, 3 Drawing Sheets

VERIFICATION OF COLLISION DETECTION AND RESOLUTION IN A HOME NETWORK

FIELD OF THE INVENTION

The present invention relates to home networks, and more particularly to a method and system for verifying collision detection and resolution on the home network.

BACKGROUND OF THE INVENTION

HomePNA or HPNA is a de facto home networking standard developed by the Home Phoneline Networking Alliance. HPNA allows all the components of a home network to interact over the home's existing telephone wiring without disrupting voice capability. In the same way a LAN operates, home networking processes, manages, transports and stores information, which enables disparate devices in a home network such as telephones, fax machines, desktops, laptops, printers, scanners and Web cameras to connect and integrate over a existing wiring topology.

To create the home network, personal computers may be equipped with a HPNA network and HPNA software. An HPNA network may be implemented as an internal PC network interface card (NICs) that includes telephone jacks on the back for connection to the network. An HPNA network may also be implemented in an external USB adapter that plugs into the USB port on the PC on one end, while the other end connects to the phone line at the wall jack. Additionally, an HPNA network may be implemented as part of the chipset or ACR (Advanced Communications Riser).

FIG. 1 illustrates an embodiment of a home phone line network that complies with the Home Phoneline Networking Alliance (HPNA) specification version 2.0. The network allows multiple computers to communicate through telephone wire of residential homes. The network includes an application program running on the PC called a host media access controller (MAC) 112, and a control chip 100 for implementing the HPNA 2.0 specification, which is included on a network interface card. The control chip 100 includes a Media Independent Interface (MII) 106, a Media Access Controller (MAC) 108, and a Physical Layer (PHY) 110.

The host MAC 112 sends data packets out over the home network, and receives data packets from the network, through the control chip 100. The control chip 100 communicates with an analog front end (AFE) 104 that processes signals between the chip 100 and the transmission channel, which in this case are the telephone lines of the house that are accessed via a phone jack 102. The AFE 104 converts outgoing digital signals into analog signals, and converts incoming analog signals into digital signals.

When the host MAC 112 transmits a frame of data over the telephone lines, it is possible that another station on the network may be in the process of transmitting a frame of data. This situation may result in a packet collision, which degrades overall network performance. There are various schemes to resolve collisions, but such schemes typically require a user to scope signals over the network to determine whether the collision detection and resolution are operating properly.

Accordingly, what is needed is a method and system for verifying collision detection and resolution on a home network without requiring a user to monitor activity on the transmission channel. The present invention addresses such a need.

SUMMARY OF THE INVENTION

The present invention provides a method and system for verifying collision detection and resolution in a home network, the home network comprising a plurality of stations. Each station in the network includes a host media access controller program and a media access controller, where each station may transmit a frame when a transmission channel is inactive. When a collision is detected, the station ceases transmission of the frame, and chooses a backoff level to resolve the conflict. The station increments a backoff level counter in response to receiving backoff signal from another station on the network, and decrements the backoff counter in response to successfully transmitting the frame. The backoff level counter is maintained such that it may be accessed through the host media access controller for monitoring collision resolution.

According to the system and method disclosed herein, the present invention allows a user to monitor and diagnose the home network by reading contents of the backoff counters through the host MAC to verify that collision detection and resolution are operating as intended, thereby eliminating the need to scope signals over the network.

DETAILED DESCRIPTION

The present invention relates to verifying the detection and resolution of collisions occurring between stations in a home network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
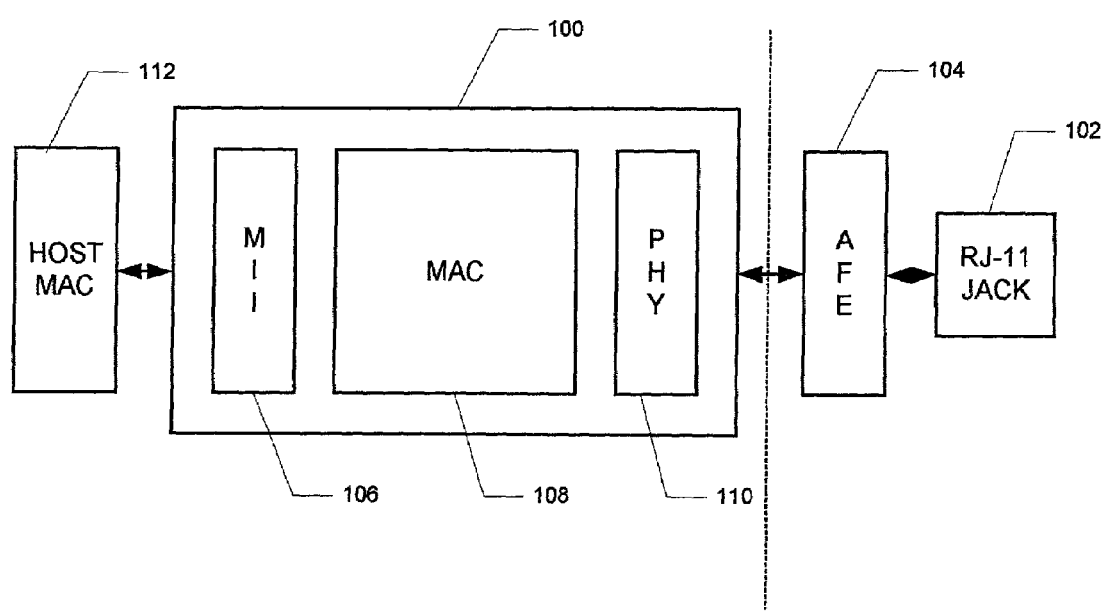
FIG. 1 illustrates an embodiment of a home phone line network that complies with the Home Phoneline Networking Alliance (HPNA) specification version 2.0.
Figure 2:
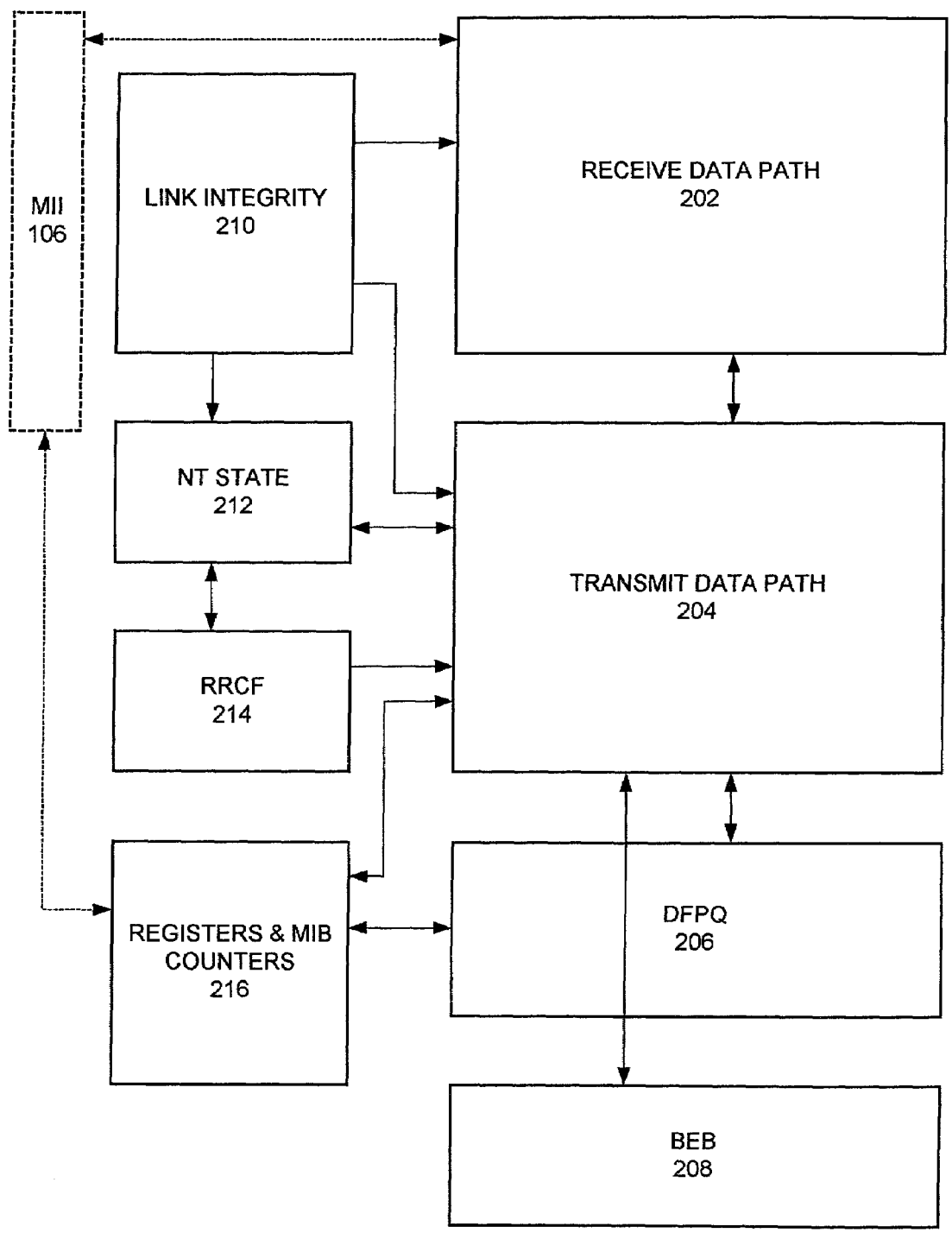
FIG. 2 illustrates a preferred embodiment of the MAC in accordance with the present invention.

FIG. 2 illustrates a preferred embodiment of the MAC 108 in accordance with the present invention. The MAC 108 comprises a Receive Data Path 202, a Transmit Data Path 204, a Distributed Fair Priority Queuing (DFPQ) 206, a Binary Exponential Backoff (BEB) 208, a Link Integrity 210, a Network State 212, a Rate Request Control Frame (RRCF) 214, a plurality of registers and Management Information Base (MIB) counters 216.

The Receive Data Path 202 receives data packets from the PHY 110 and sends data packets to the MII 106. In the preferred embodiment, after the Receive Data Path 202 sends each data packet to the MII 106, another packet, referred to as a "frame status frame", is sent immediately following. The frame status frame contains certain status information required by subsequent processes.

The Transmit Data Path 204, which receives frames of data packets from the MII 106 and transmits them to the PHY 110. The registers and MIB counters 216 provide programmability to the MAC 108 and handles error event counting.

The Link Integrity 210 monitors the physical network conditions. In the preferred embodiment, the Link Integrity 210 updates a link status bit in a link register. The Link Integrity 210 also sends link packets in accordance with the HPNA 2.0 specification.

The Network State 212 monitors the current mode of the MAC 108, i.e., whether the MAC 108 is operating in the 10M8 data rate mode or the 1M8 data rate mode ("1M8"). In the 10 Mbps mode, traffic may run at 10 Mbps, but can be varied based on the medium conditions. The RRCF 214 sends a RRCF whenever the MAC 108 transitions between data rates. The RRCF is used to perform the rate negotiation function, i.e., to determine what is the data rate to communicate between different stations in a home phone line network.

The MAC 108 performs carrier sense with collision detection (CSMA/CD), as defined in IEEE 802.3, through the use of the DFPQ 206 and the BEB 208. CSMA/CD is a media access method in which two or more stations on the home network share a common transmission channel. To transmit, a station waits (defers) for a quiet period on the channel, typically indicated by an inactive carrier sense signal. When no other station is transmitting, the MAC 108 passes the intended message to the PHY 110 for modulation and transmission.

When operating in the 10M8 mode, the chip 100 may carry media streams, such as audio and video. To reduce the latency variation in these streams, a priority mechanism is implemented to allow higher layers to label outgoing frames with priority, and guarantee that those frames will have preferential access to the channel over lower priority frames. The access priority method implemented is to delay transmissions to a slot beyond a minimum inter-frame gap, based on the priority level of the frame waiting to be transmitted. In a preferred embodiment, the transmission deferral is ordered by up to eight priority levels, implementing absolute priority among stations contending for access.

Stations waiting for transmission monitor the Carrier Sense (CS) and defer if CS was true prior to the start of the next priority slot. Any station ready to transmit at the start of the next priority slot in which it can transmit shall transmit at the start of that priority slot without deferring if CS was false prior to the start of that priority slot.

After a station transmits a frame, there are two outcomes; successful and unsuccessful frame transmission. A successful frame transmission indicates that all MAC's on the phone line network are synchronized with respect to reception of frame termination. A collision or unsuccessful transmission occurs when two or more stations are active with ready frames and are contending for access to the channel at approximately the same time; generally, collisions are between frames at the same priority level. If after initiating a transmission, a message collides with that of another station, each station ceases transmission.

The DFPQ 206 and the BEB 208 provide collision resolution for the MAC 108. The DFPQ 206 provides collision resolution for the 10M8 data rate, while the BEB 208 provides collision resolution for the 1M8 data rate. In the preferred embodiment, the PHY 110 will provide a collision detect signal, and either the DFPQ 206 or the BEB 208 will then attempt to resolve the collision depending on the operating mode.

According to the present invention, the traditional CSMA/CD method is augmented to provide back-off levels to aid in resolving collisions. The DFPQ 206 implements a Distributed Fair Priority Queuing (DFPQ) algorithm for choosing backoff levels that guarantees access latency is tightly bounded. In a preferred embodiment, after a collision is detected and each station ceases transmission, each station attempts to resolve the collision by randomly choosing one of plurality of backoff levels and deferring to other stations that have chosen a lower backoff level. A station with a lower backoff level will have the opportunity to transmit first. If more than one station chooses the same backoff level, they may collide again resolve further.

More specifically, stations having a zero backoff level are allowed to transmit over the channel, while stations having a nonzero backoff levels must defer acquiring the channel. After the winning station completes its transmission, all stations reduce their backoff level by one if it is greater than zero, and the new station(s) at backoff level 0 attempt transmission.

Note that all stations, even those with no frame to transmit, monitor the activity on the medium. Also, note that the collision resolution cycle is closed, so that stations that did not collide are not allowed to contend for access to the medium until all stations that collided have transmitted one frame successfully or have forgone the right to transmit their waiting frame. Ultimately, all stations that were contending for access in the initial collision gain access to the wire and the collision resolution cycle is ended. This results in access latency being tightly bounded.

Although providing backoff levels effectively resolves conflicts, a need arises to monitor backoff level activity among the stations for diagnostic purposes. One method for monitoring the backoff levels is to scope signals traveling across the channel. However, this method can become complicated since it requires the use of external snooping equipment.

According to the present invention, the backoff level activity may be monitored without snooping signals across the channel by providing a plurality of backoff level counters that are programmable and accessible through the host MAC 112.

Figure 3A:
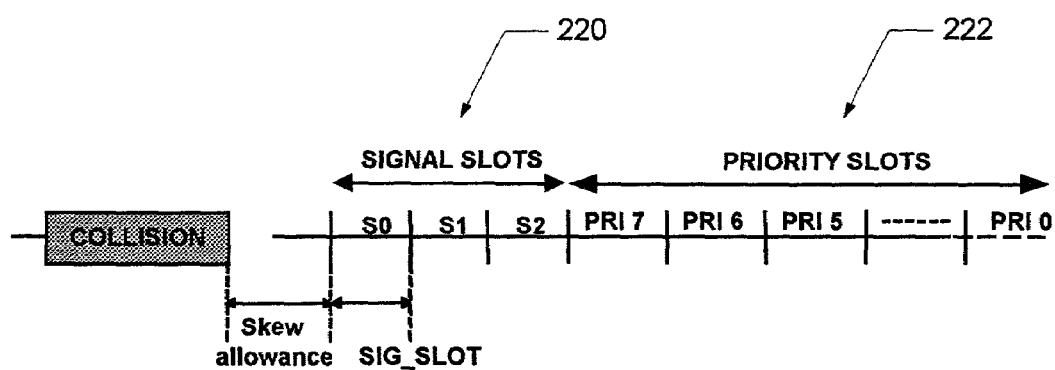
FIG. 3A is a block diagram illustrating MAC timing for an unsuccessful transmission of a frame due to a collision.

FIG. 3A is a block diagram illustrating MAC timing for an unsuccessful transmission of a frame due to a collision. In a preferred embodiment, a station chooses a backoff level by choosing one of three backoff level signal slots (S0 . . . S2) 220 that follow a collision along with eight priority slots 222. The backoff signal slots 220 only occur after collisions, they do not follow successful transmissions. In a preferred embodiment the width of a backoff signal slot is 32.0 microseconds (SIG_SLOT). The first backoff signal slot is timed from the detected start of the first of the overlapping collision fragments.

Figure 3B:
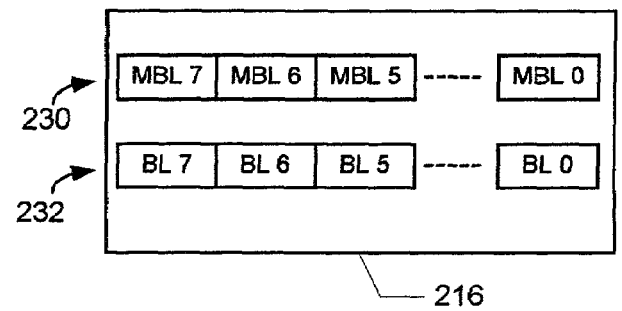
FIG. 3B is a diagram showing that each station maintains one DFPQ maximum backoff level (MBL) counter and one backoff level (BL) counter for each of the priority slots, in accordance with the present invention.

FIG. 3B is a diagram showing that each station maintains one DFPQ maximum backoff level (MBL) counter 230 and one backoff level (BL) counter 232 for each of the priority slots, in accordance with the present invention. In a preferred embodiment, the MBL counters 230 and the BL counters 232 are maintained as 4-bit register type memories in the registers and MIB counters 216 section of the MAC 108, and are fully accessible by the host MAC 112.

When a conflict is detected, the MAC 108 of each station uses the backoff signal slots 220 and BL and MBL counters 230 and 232 to resolve the conflict and to record the resolution as follows.

The MBL and BL counters 230 and 232 are initialized to zero after a reset. When a conflict is detected, each active station pseudo-randomly chooses one of the backoff signal slots 220, and transmits a BACKOFF signal in that time slot. More than one station can transmit a BACKOFF signal in the same slot. The active stations transmit BACKOFF signals to indicate ordering information that determines the new backoff levels to be used.

All stations (even those without a frame ready to transmit) monitor collision events and the Backoff Signal slots 220 to compute the backoff level. The MBL counter 230 is incremented for each BACKOFF signal detected, and decremented when a successful transmission occurs. If an active station sees a BACKOFF signal in a slot 220 prior to the one it chose, it increases its backoff level by incrementing the BL counter 232.

Stations at backoff level 0 (ones that are actively contending) that did not detect BACKOFF signals prior to the one they chose remain at backoff level 0 and contend for transmission in the priority slot equal to the priority slot that immediately follows the BACKOFF signal sequence. Eventually, only one station remains at backoff level 0 (indicated by the BL counter 232) and successfully gains access to the channel. Note that stations with higher priority waiting frames may pre-empt the collision resolution by transmitting in a higher-priority slot. Once the station successfully transmits its frame in a backoff level slot 220 in the channel, all other stations reduce their backoff level by one by decrementing the BL counter 232 corresponding to that slot if it is greater than zero.

For monitoring and diagnosing the home network, a user can read the contents of the MBL counters 230 and the BL counters 232 through the host MAC 112 to verify that collision detection and resolution are operating as intended, thus eliminating the need to scope signals over the network.

A method and system for verifying collision detection and resolution on the home network has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for verifying collision detection and resolution in a home network, the home network comprising a plurality of stations wherein each station includes a host media access controller program and a media access controller, the method comprising the steps of:
   (a) transmitting a frame when a transmission channel is inactive;
   (b) when a collision is detected,
      (i) ceasing transmission of the frame,
      (ii) choosing a backoff level,
      (iii) incrementing a backoff level counter in response to receiving backoff signal from another station on the network,
      (iv) decrementing the backoff counter in response to successfully transmitting the frame; and
   (c) accessing the backoff level counter through the host media access controller such that collision resolution can be monitored without snooping signals over the network.

2. The method of claim 1 wherein step (a) further includes the step of deferring transmission of a frame when the transmission channel is active.

3. The method of claim 2 wherein step (a) further includes the step of transmitting a frame in one of a plurality of priority slots.

4. The method of claim 3 wherein step (a) further includes the step of maintaining a first and second backoff level counters for each of the priority slots.

5. The method of claim 4 wherein step (a) further includes the step of initializing the first and second backoff level counters to zero after a reset.

6. The method of claim 5 wherein step (b)(ii) further includes the step of randomly choosing a backoff level by choosing backoff level signal slot and transmitting a backoff signal in that slot.

7. The method of claim 6 wherein step (b)(iii) further includes the step of incrementing the first backoff level counter in response to receiving backoff signal from another station on the network.

8. The method of claim 7 wherein step (b)(iv) further includes the step of in response to detecting a backoff signal in a slot prior to the backoff level signal slot chosen, increasing the backoff level by incrementing the second backoff level counter.

9. The method of claim 8 wherein step (b)(iv) further includes the step of:
   (1) when any station successfully transmits a frame, reducing the backoff level by one by decrementing the second backoff level counter if it is greater than zero, and
   (2) when the second backoff level counter reaches zero transmitting the frame of the network.

10. The method of claim 4 further including the step of maintaining the first and second backoff level counters as 4-bit register type memories in the MAC.

11. A method for verifying collision detection and resolution in a home network, the home network comprising a plurality of stations wherein each station includes a host media access controller program and a media access controller, the method comprising the steps of:
   (a) transmitting a frame in one of a plurality of priority slots;
   (b) providing the media access controller with at least one backoff level counter for each of the priority slots;
   (c) in response to detecting a frame collision, ceasing transmission;
   (d) resolving the collision by
      (i) randomly choosing one from among a plurality of backoff level slots,
      (ii) transmitting a backoff signal in that slot; and
      (iii) monitoring the backoff level slots and incrementing the backoff level counter for each backoff signal detected, and decrementing the backoff level counter after a successful transmission, whereby transmission is deferred to stations having a lower backoff level count; and
   (e) accessing the backoff level counters from the host media access controller program to verify that collision resolution is operating as intended, thereby eliminating the need to snoop signals over the network.

12. The method of claim 11 wherein step (b) further includes the step of maintaining a first and second backoff level counters for each of the priority slots.

13. The method of claim 12 wherein step (d)(iii) further includes the step of incrementing the first backoff level counter in response to receiving backoff signal from another station on the network.

14. The method of claim 13 wherein step (d)(iii) further includes the step of in response to detecting a backoff signal in a slot prior to the backoff level signal slot chosen, increasing the backoff level by incrementing the second backoff level counter.

15. The method of claim 14 wherein step (d)(iii) further includes the step of:
 (1) when any station successfully transmits a frame, reducing the backoff level by one by decrementing the second backoff level counter if it is greater than zero, and
 (2) when the second backoff level counter reaches zero transmitting the frame of the network.

16. A home network comprising a plurality of stations, wherein each station comprises,
 a control chip for implementing a home phoneline network alliance specification, the control chip including,
  a plurality of backoff level registers accessible by the host media access controller program, and
  a media access controller (MAC), the MAC further including,
   a Transmit Data Path for transmitting frames of the network, each frame assigned a priority level that the first transmission of the frame to a slot corresponding to the priority level, wherein the frame is transmitted when a carrier sense signal is inactive, and transmission of the frame is suspended when a collision is detected,
   a Distributed Fair Priority Queuing (DFPQ) for resolving frame collisions by choosing one of a plurality of backoff levels and deferring to stations that have chosen a lower backoff level, incrementing the backoff level counter when a backoff level signal is received from another station on the network, and once the station completes a transmission, reducing the backoff level by decrementing the backoff level counter, such that when the counter reaches zero the MAC transmits the frame; and
 a host media access controller program in communication with the MAC for accessing the backoff level counter to verify that collision detection and resolution are operating, thereby eliminating the need to snoop signals over the home network.

17. The home network of claim 16 wherein frame transmission deferral is ordered by up to 8 priority levels.

18. The home network of claim 17 wherein there are three backoff levels.

19. The home network of claim 18 wherein the MAC includes one maximum backoff level counter and one backoff level counter for each of the priority levels.

20. The home network of claim 19 wherein the maximum backoff level counter indicates a number of backoff level signals received over the home network, and wherein the backoff level counter indicates the backoff level of the corresponding station.

21. The home network of claim 20 wherein the maximum backoff level counter and the backoff level counter are part of the MAC.

22. A method for verifying collision detection and resolution in a home network, the home network comprising a plurality of stations wherein each station includes a host media access controller program and a media access controller (MAC), wherein the MAC transmits frames in one of a plurality of priority slots, the method comprising the steps of:
 (a) maintaining a first and second backoff level counters for each of the priority slots;
 (b) initializing the first and second backoff level counters to zero after a reset;
 (c) when a conflict is detected, randomly choosing a backoff level signal slot and transmitting a backoff signal in that slot;
 (d) monitoring collision events and the backoff level signal slots;
 (e) incrementing the first backoff level counter in response to receiving backoff signal from another station on the network to indicate a total number of backoff signals received;
 (f) decrementing the first backoff counter in response to successfully transmitting the frame to reduce a backoff level;
 (g) in response to detecting a backoff signal in a slot prior to the backoff level signal slot chosen, increasing the backoff level by incrementing the second backoff level counter;
 (h) when any station successfully transmits a frame, reducing the backoff level by one by decrementing the second backoff level counter if it is greater than zero;
 (i) when the second backoff level counter reaches zero, transmitting the frame over the network; and
 (j) monitoring and diagnosing the home network by reading first and second backoff level counters through the host media access controller program to verify that collision detection and resolution are operating as intended, thus eliminating the need to snoop signals over the network.

* * * * *